US012490089B2

(12) United States Patent
Pattnaik

(10) Patent No.: US 12,490,089 B2
(45) Date of Patent: Dec. 2, 2025

(54) NETWORK NODES AND METHODS THEREIN FOR FACILITATING REGISTRATION OF TERMINAL DEVICE

(71) Applicant: Telefonaktiebolaget LM Ericsson (publ), Stockholm (SE)

(72) Inventor: Debashish Pattnaik, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 320 days.

(21) Appl. No.: 18/276,410

(22) PCT Filed: Feb. 9, 2021

(86) PCT No.: PCT/CN2021/076327
§ 371 (c)(1),
(2) Date: Aug. 8, 2023

(87) PCT Pub. No.: WO2022/170503
PCT Pub. Date: Aug. 18, 2022

(65) Prior Publication Data
US 2024/0107303 A1 Mar. 28, 2024

(51) Int. Cl.
*H04W 12/06* (2021.01)
*H04L 67/55* (2022.01)
(Continued)

(52) U.S. Cl.
CPC ............ *H04W 12/06* (2013.01); *H04L 67/55* (2022.05); *H04W 12/0431* (2021.01); *H04W 12/72* (2021.01)

(58) Field of Classification Search
CPC ....... H04W 8/20; H04W 12/35; H04W 76/14; H04W 12/06; H04W 8/04; H04W 12/72; H04W 12/43; H04L 63/061; H04L 67/55
See application file for complete search history.

(56) References Cited

U.S. PATENT DOCUMENTS 10,158,625 B2 * 12/2018 Liu .................. H04W 76/14
11,178,125 B2 * 11/2021 Zhu .................. H04L 63/061
(Continued)

FOREIGN PATENT DOCUMENTS

CN    109803350 A      5/2019
CN    114270900 B  *   3/2023   ............ H04W 12/06
(Continued)

OTHER PUBLICATIONS

Holmber, G. , et al., "Push Notification with the Session Initiation Protocol (SIP) draft-ietf-sipcore-sip-push-20", Sipcore Working Group, Internet-Draft Ericsson, Intended status: Standards Track, Oct. 19, 2018, 1-30.
(Continued)

*Primary Examiner* — Jinsong Hu
(74) *Attorney, Agent, or Firm* — Sonoda & Kobayashi Intellectual Property Law; Sarvajit S. Patil

(57) ABSTRACT

The present disclosure provides a method (300) in a Push Notification Server, PNS. The method (300) includes: receiving (310), from a terminal device, a terminal identifier of the terminal device, a network identifier of a serving network of the terminal device, and an identifier of an Access and Mobility Management Function, AMF; transmitting (320), to the AMF, a request for an identifier of an Authentication Server Function, AUSF; receiving (330) the identifier of the AUSF from the AMF; and transmitting (340), to the AUSF, the terminal identifier, the network identifier, and the identifier of the AMF.

9 Claims, 12 Drawing Sheets

(51) Int. Cl.
*H04W 8/20* (2009.01)
*H04W 12/0431* (2021.01)
*H04W 12/72* (2021.01)
*H04W 76/14* (2018.01)

(56) References Cited

U.S. PATENT DOCUMENTS

| | | | | |
|---|---|---|---|---|
| 11,503,533 | B2* | 11/2022 | You | H04W 12/06 |
| 11,553,342 | B2* | 1/2023 | Mahalank | H04W 8/04 |
| 2016/0127896 | A1* | 5/2016 | Lee | H04W 12/06 455/411 |
| 2020/0344604 | A1* | 10/2020 | He | H04L 9/30 |
| 2020/0383150 | A1 | 12/2020 | Ma et al. | |
| 2021/0099867 | A1* | 4/2021 | Brown | H04W 12/35 |
| 2023/0156469 | A1* | 5/2023 | Murakami | H04W 8/20 455/411 |

FOREIGN PATENT DOCUMENTS

| | | | |
|---|---|---|---|
| WO | 2020025138 A1 | 2/2020 | |
| WO | 2020034378 A1 | 2/2020 | |
| WO | WO-2023073670 A1 * | 5/2023 | H04W 12/033 |

OTHER PUBLICATIONS

Holmberg, C., et al., "Push Notification with the Session Initiation Protocol (SIP)", Internet Engineering Task Force (IETF), Request for Comments: 8599, Ericsson, May 2019, 1-40.

Unknown, Author, "A solution for equipment identifier authentication using EAP", Huawei, HiSilicon, 3GPP TSG SA WG3 (Security) Meeting #86, S3-170123, revision of S3-17xabc, Feb. 6-10, 2017, 1-3.

* cited by examiner

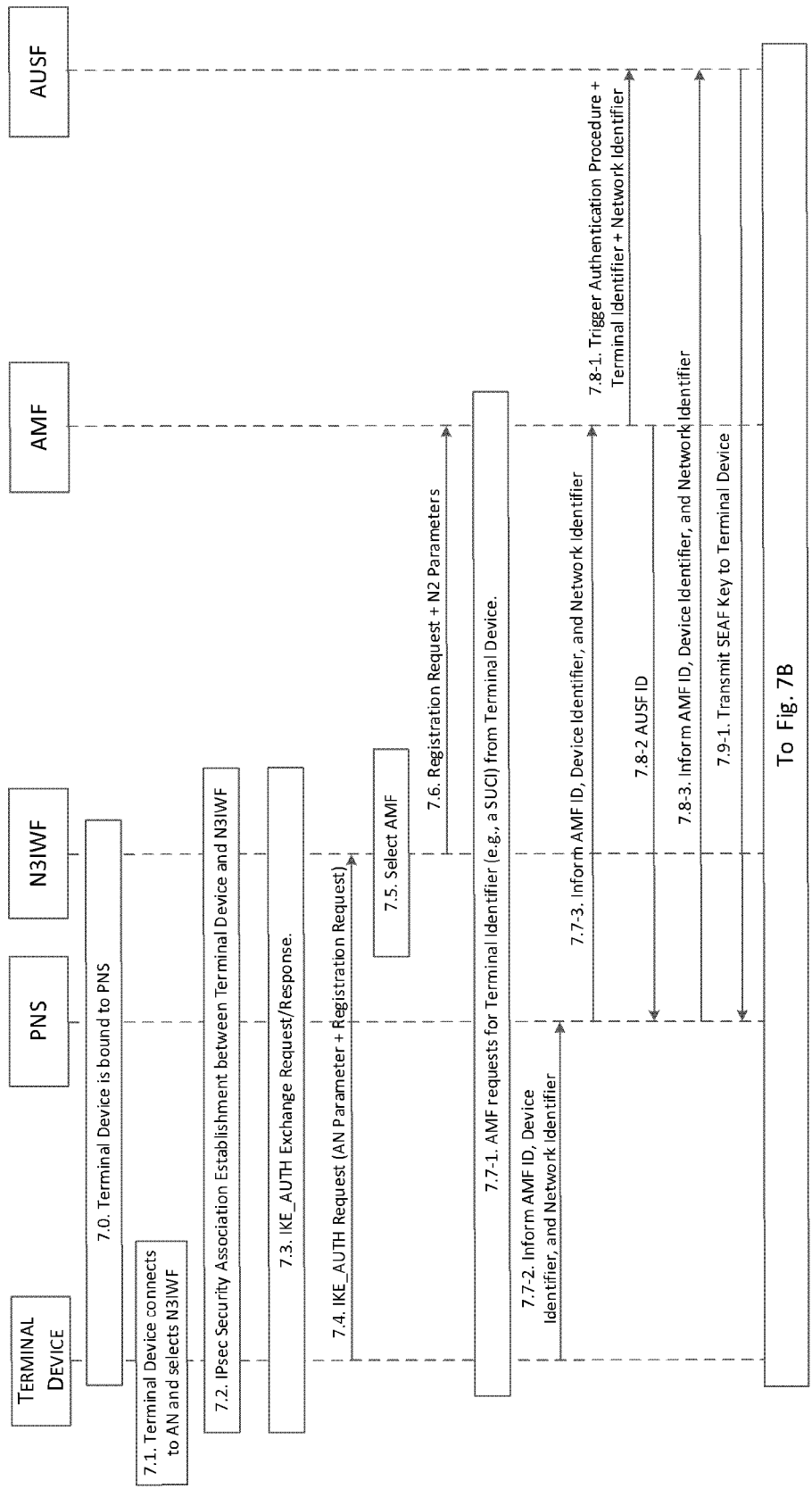

PNS
800

PNS
900

NETWORK NODES AND METHODS THEREIN FOR FACILITATING REGISTRATION OF TERMINAL DEVICE

TECHNICAL FIELD

The present disclosure relates to communication technology, and more particularly, to network nodes and methods therein for facilitating registration of a terminal device.

BACKGROUND

A push notification, also known as a server push notification, refers to delivery of information to a terminal device from an application server, where a request for transaction is initiated by the application server rather than by the terminal device.

In order to save resources, e.g., battery lives, some terminal devices and operating systems will suspend applications when they are not used. In some cases, internal timers cannot be used to wake such applications, nor will incoming network traffic wake them. Instead, one way to wake an application is to use a push notification service. Typically, each operating system uses a dedicated push notification service. For example, Apple iOS devices use the Apple Push Notification (APN) service, while Android devices use the Firebase Cloud Messaging (FCM) service.

The $3^{rd}$ Generation Partnership Project (3GPP) has defined a push notification in a Proxy Call Session Control Function (P-CSCF), which supports transmitting a push notification to a Push Notification Server (PNS). The push notification is used to wake up applications in Apple iOS devices and Android devices for terminating services, e.g., terminating calls for WIFI callings. In that process, the P-CSCF is responsible for transmitting a push notification request to the PNS to wake up an application when there is a terminating request targeted to that application, or when the P-CSCF wants to wake up the application for re-registration. The following information is conveyed by a $5^{th}$ Generation (5G) Core (5GC) network to the P-CSCF at IP Multimedia Subsystem (IMS) registration:

the address of the PNS; and additional information required by a device vendor to identify the application.

When there is an incoming request targeted to the application, the P-CSCF constructs a push notification request and transmits it to the PNS. The PNS transmits the request to the terminal device and wakes up the target application. This results in the target application re-registering in the IMS and subsequently receiving the incoming request and handling the request accordingly. The push notification process and associated IMS registration and re-registration processes are illustrated in FIGS. 1A-1B and FIGS. 2A-2B in detail.

FIGS. 1A and 1B are sequence charts showing an exemplary process of registration of a terminal device, or User Equipment (UE), to a 5GC network via an untrusted non-3GPP Access Network (AN), e.g., a WiFi network. The registration process is based on a vendor specific Extensible Authentication Protocol (EAP) method called "EAP-5G".

As shown in FIG. 1A, at 1.1, the terminal device connects to the untrusted non-3GPP AN, and selects a Non-3GPP Interworking Function (N3IWF) in a 5G Public Land Mobile Network (PLMN), in order to attach to the 5GC network. At 1.2, the terminal device performs establishment of an IPSec Security Association (SA) with the selected N3IWF by initiating an Internet Key Exchange (IKE) to ensure all subsequent IKE messages are encrypted and integrity protected by using the established IPSec SA. At 1.3, the terminal device initiates an IKE_AUTH exchange by transmitting an IKE_AUTH request message. The N3IWF responds with an IKE_AUTH response message which includes an EAP-Request/5G-Start packet. The EAP-Request/5G-Start packet informs the terminal device to initiate an EAP-5G session, i.e., to start transmitting Non-Access Stratum (NAS) messages encapsulated within EAP-5G packets. At 1.4, the terminal device transmits, to the N3IWF, an IKE_AUTH request which includes an EAP-Response/5G-NAS packet that contains AN parameters and a Registration Request. The AN parameters may contain information that is used by the N3IWF for selecting an Access and Mobility Management Function (AMF) in the 5GC network, e.g., a Globally Unique AMF Identifier (GUAMI), an identifier (ID) of the selected PLMN, a Network Slice Selection Assistance Information (NSSAI), and an establishment cause. At 1.5, the N3IWF selects an AMF based on the received AN parameters and local policy. At 1.6, the N3IWF forwards the Registration Request received from the terminal device to the selected AMF within an N2 message, which contains N2 parameters, e.g., the ID of the selected PLMN and the establishment cause.

Continuing with FIG. 1A, at 1.7, the selected AMF requests a terminal identifier of the terminal device, e.g., a Subscriber Concealed Identifier (SUCI), by sending a NAS Identity Request message to the terminal device. This NAS Identity Request message and all subsequent NAS messages are encapsulated within EAP/5G-NAS packets and transmitted to the terminal device. The terminal device responds to the AMF with the requested terminal identifier and a network identifier of a serving network of the terminal device. At 1.8, the AMF authenticates the terminal device by invoking an Authentication Server Function (AUSF). In this case, the AMF selects an AUSF based on the terminal identifier and forwards the terminal identifier and the network identifier to the AUSF. At 1.9, the selected AUSF transmits, to the AMF, an EAP/ACK challenge for the terminal device. At 1.10, the AMF forwards the EAP/ACK challenge to the N3IWF. At 1.11, the N3IWF forwards the EAP/ACK challenge to the terminal device. At 1.12, the terminal device transmits an EAP/ACK challenge response to the N3IWF. At 1.13, the N3IWF forwards the EAP/ACK challenge response to the AMF. At 1.14, the AMF forwards the EAP/ACK challenge response to the AUSF.

Turning to FIG. 1B, at 1.15, in the case where the EAP/ACK authentication challenge is successful, the AUSF transmits a security key, e.g., a Security Anchor Function (SEAF) key, to the AMF. The AMF may derive NAS security keys and a N3IWF key based on the received SEAF key. At 1.16, the AMF transmits a NAS Security Mode Command and an encapsulated SEAF key to the N3IWF. At 1.17, the N3IWF forwards the NAS Security Mode Command and the encapsulated SEAF key to the terminal device. Then, the terminal device may derive a N3IWF key and NAS security keys based on the received SEAF key. At 1.18, the terminal device transmits a NAS Security Mode Complete message along with a NAS security context to the N3IWF. At 1.19, the N3IWF forwards the NAS Security Mode Complete message along with the NAS security context to the AMF. At 1.20, upon receiving the NAS Security Mode Complete, the AMF transmits, to the N3IWF, a Next Generation Application Protocol (NGAP) Initial Context Setup Request message that includes the N3IWF key. At 1.21, the N3IWF transmits an EAP Success message to the terminal device, which completes the EAP-5G session. At 1.22, the IPSec SA is established between the terminal device and the N3IWF. At 1.23, the N3IWF notifies the AMF that a context for the terminal device has been created by transmitting a Context Setup Complete message. At 1.24, the AMF transmits, to the N3IWF, a NAS Registration Accept message containing a list of allowed NSSAIs for the access type for the terminal device. At 1.25, the N3IWF forwards the NAS Registration Accept message to the terminal device via the established IPSec SA, which completes the registration process.

FIGS. 2A and 2B are sequence charts showing an exemplary process of registration of a terminal device to a 5GC network via an untrusted non-3GPP AN, with a push notification process for waking up the terminal device. The terminal device supports push notification service, and is bound to a PNS, as shown at 2.0 in FIG. 2A. In this example, the terminal device also registers with a 5GC network via an untrusted non-3GPP AN, thus the registration process is the same as that shown in FIGS. 1A-1B. In particular, steps 2.1-2.14 in FIG. 2A are the same as steps 1.1-1.14 in FIG. 1A, respectively, and steps 2.15-2.25 in FIG. 2B are the same as steps 1.15-1.25 in FIG. 1B, respectively. Description of these steps will be omitted here for brevity. After the registration process from step 2.1 in FIG. 2A to step 2.15 in FIG. 2B is completed, at 2.26, the terminal device may enter a sleeping mode for saving resources and thus be detached from the 5GC network. At 2.27, when there is a terminating request targeted to the terminal device, a PNS wakes up the terminal device through a push notification process. At 2.28, the terminal device wakes up and re-registers with the 5GC network, e.g., by performing the above registration process again.

SUMMARY

It is an object of the present disclosure to provide network nodes and methods therein for facilitating registration of a terminal device.

According to a first aspect of the present disclosure, a method in a PNS is provided. The method includes: receiving, from a terminal device, a terminal identifier of the terminal device, a network identifier of a serving network of the terminal device, and an identifier of an AMF; transmitting, to the AMF, a request for an identifier of an AUSF; receiving the identifier of the AUSF from the AMF; and transmitting, to the AUSF, the terminal identifier, the network identifier, and the identifier of the AMF.

In an embodiment, the request may contain the terminal identifier, the network identifier, and the identifier of the AMF.

In an embodiment, the method may further include: receiving a security key from the AUSF; and transmitting the security key to the terminal device.

In an embodiment, the security key may be a SEAF key.

In an embodiment, the terminal identifier may be a SUCI.

According to a second aspect of the present disclosure, a PNS is provided. The PNS includes a communication interface, a processor and a memory. The memory stores instructions executable by the processor whereby the PNS is operative to perform the method according to the above first aspect.

According to a third aspect of the present disclosure, a computer readable storage medium is provided. The computer readable storage medium has computer program instructions stored thereon. The computer program instructions, when executed by a processor in a PNS, cause the PNS to perform the method according to the above first aspect.

According to a fourth aspect of the present disclosure, a method in a terminal device is provided. The method includes: transmitting, to a PNS, a terminal identifier of the terminal device, a network identifier of a serving network of the terminal device, and an identifier of an AMF; receiving a security key from the PNS; and deriving a Non-Access Stratum, NAS, security key and a N3IWF key based on the received security key.

In an embodiment, the operation of transmitting may be performed in parallel with transmitting the terminal identifier and the network identifier to the AMF.

In an embodiment, the security key may be a SEAF key.

In an embodiment, the terminal identifier may be a SUCI.

In an embodiment, the operation of deriving may be performed prior to receiving the security key from an N3IWF.

According to a fifth aspect of the present disclosure, a terminal device is provided. The terminal device includes a communication interface, a processor and a memory. The memory stores instructions executable by the processor whereby the terminal device is operative to perform the method according to the above fourth aspect.

According to a sixth aspect of the present disclosure, a computer readable storage medium is provided. The computer readable storage medium has computer program instructions stored thereon. The computer program instructions, when executed by a processor in a terminal device cause the terminal device to perform the method according to the above fourth aspect.

According to a seventh aspect of the present disclosure, a method in an AUSF is provided. The method includes: receiving, from an AMF, a terminal identifier of a terminal device and a network identifier of a serving network of the terminal device; receiving, from a PNS, the terminal identifier, the network identifier, and an identifier of the AMF; and authenticating the terminal device based on the terminal identifier and the network identifier from the AMF and the terminal identifier, the network identifier, and the identifier of the AMF from the PNS.

In an embodiment, the method may further include: transmitting, in response to the operation of authenticating, a security key to the PNS.

In an embodiment, the operation of receiving from the PNS may be performed in parallel with the operation of receiving from the AMF.

In an embodiment, the method may further include: transmitting, in response to the operation of authenticating, the security key to the AMF. In an embodiment, the operation of transmitting the security key to the PNS may be performed in parallel with the operation of transmitting the security key to the AMF.

In an embodiment, the terminal identifier may be a SUCI.

In an embodiment, the security key may be a SEAF key.

According to an eighth aspect of the present disclosure, a network node is provided. The network node includes a communication interface, a processor and a memory. The memory stores instructions executable by the processor whereby the network node is operative to, when implementing an AUSF, perform the method according to the above seventh aspect.

According to a ninth aspect of the present disclosure, a computer readable storage medium is provided. The computer readable storage medium has computer program instructions stored thereon. The computer program instructions, when executed by a processor in a network node cause the network node to, when implementing an AUSF, perform the method according to the above seventh aspect.

According to a tenth aspect of the present disclosure, a method in an AMF is provided. The method include: receiving a request for an identifier of an AUSF from a PNS; and transmitting the identifier of the AUSF to the PNS.

In an embodiment, the request may contain a terminal identifier of a terminal device, a network identifier of a serving network of the terminal device, and an identifier of the AMF.

In an embodiment, the method may further include: receiving, from the terminal device, the terminal identifier and the network identifier. In an embodiment, the operation of receiving from the PNS may be performed in parallel with the operation of receiving from the terminal device.

In an embodiment, the method may further include: transmitting, to the AUSF, the terminal identifier and the network identifier as received from the terminal device.

In an embodiment, the operation of transmitting to the PNS may be performed in parallel with the operation of transmitting to the AUSF.

In an embodiment, the terminal identifier may be a SUCI.

According to an eleventh aspect of the present disclosure, a network node is provided. The network node includes a communication interface, a processor and a memory. The memory stores instructions executable by the processor whereby the network node is operative to, when implementing an AMF, perform the method according to the above tenth aspect.

According to a twelfth aspect of the present disclosure, a computer readable storage medium is provided. The computer readable storage medium has computer program instructions stored thereon. The computer program instructions, when executed by a processor in a network node cause the network node to, when implementing an AMF, perform the method according to the above tenth aspect.

With the embodiments of the present disclosure, a PNS is introduced in the registration of a terminal device. When compared with the registration processes shown in FIGS. 1A-1B and 2A-2B, some steps, e.g., authentication steps, can be omitted and/or some steps can be performed in parallel with others. In this way, the registration process can be improved in terms of efficiency and latency.

BRIEF DESCRIPTION OF THE DRAWINGS

The above and other objects, features and advantages will be more apparent from the following description of embodiments with reference to the figures, in which:

FIGS. 7A and 7B are sequence charts showing an exemplary registration process of a terminal device according to an embodiment of the present disclosure;

DETAILED DESCRIPTION

In the following, references in the specification to "one embodiment", "an embodiment", "an example embodiment" and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1A:
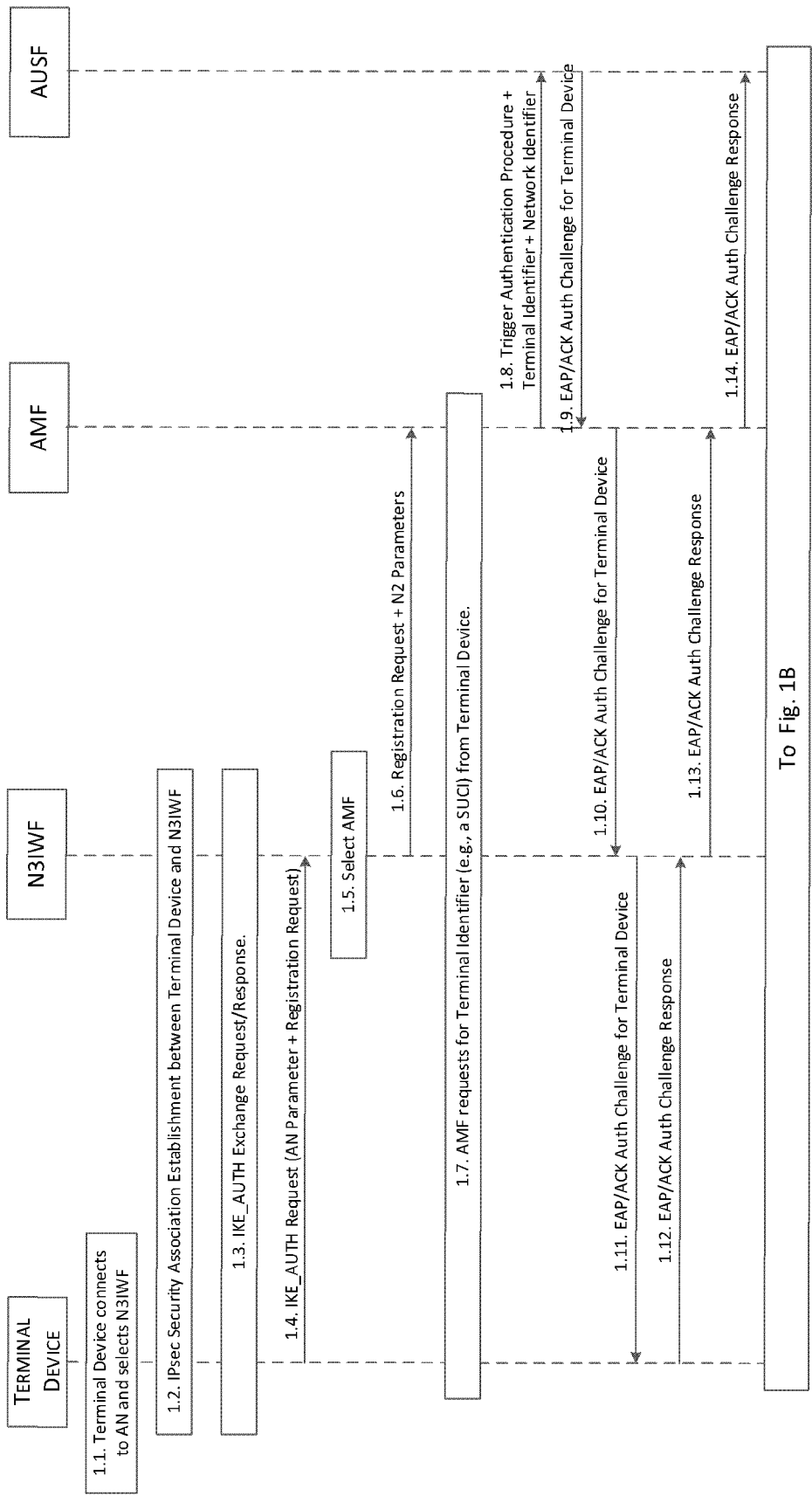
FIGS. 1A and 1B are sequence charts showing an exemplary process of registration of a terminal device to a 5GC network via an untrusted non-3GPP AN.
Figure 1B:
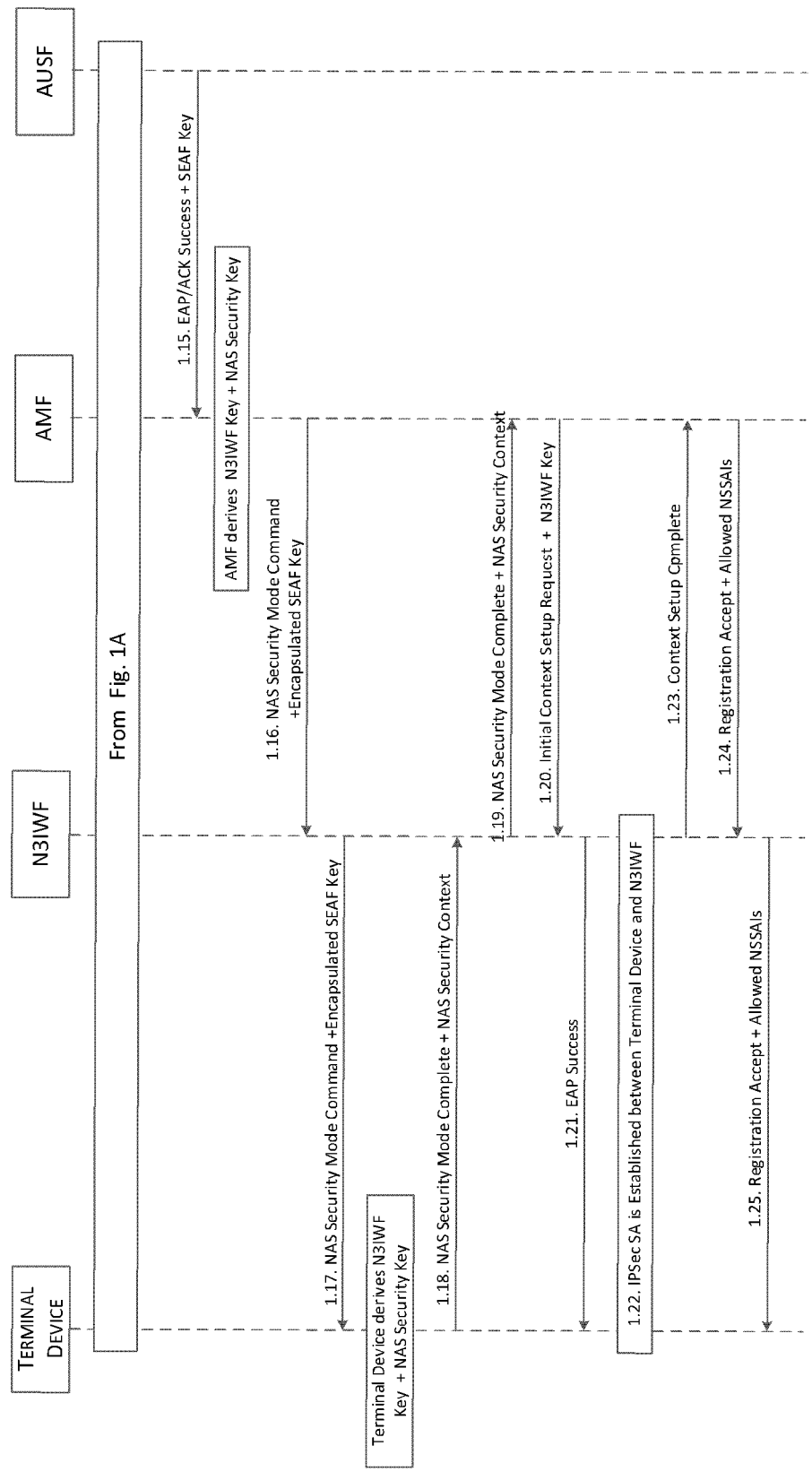
Figure 2A:
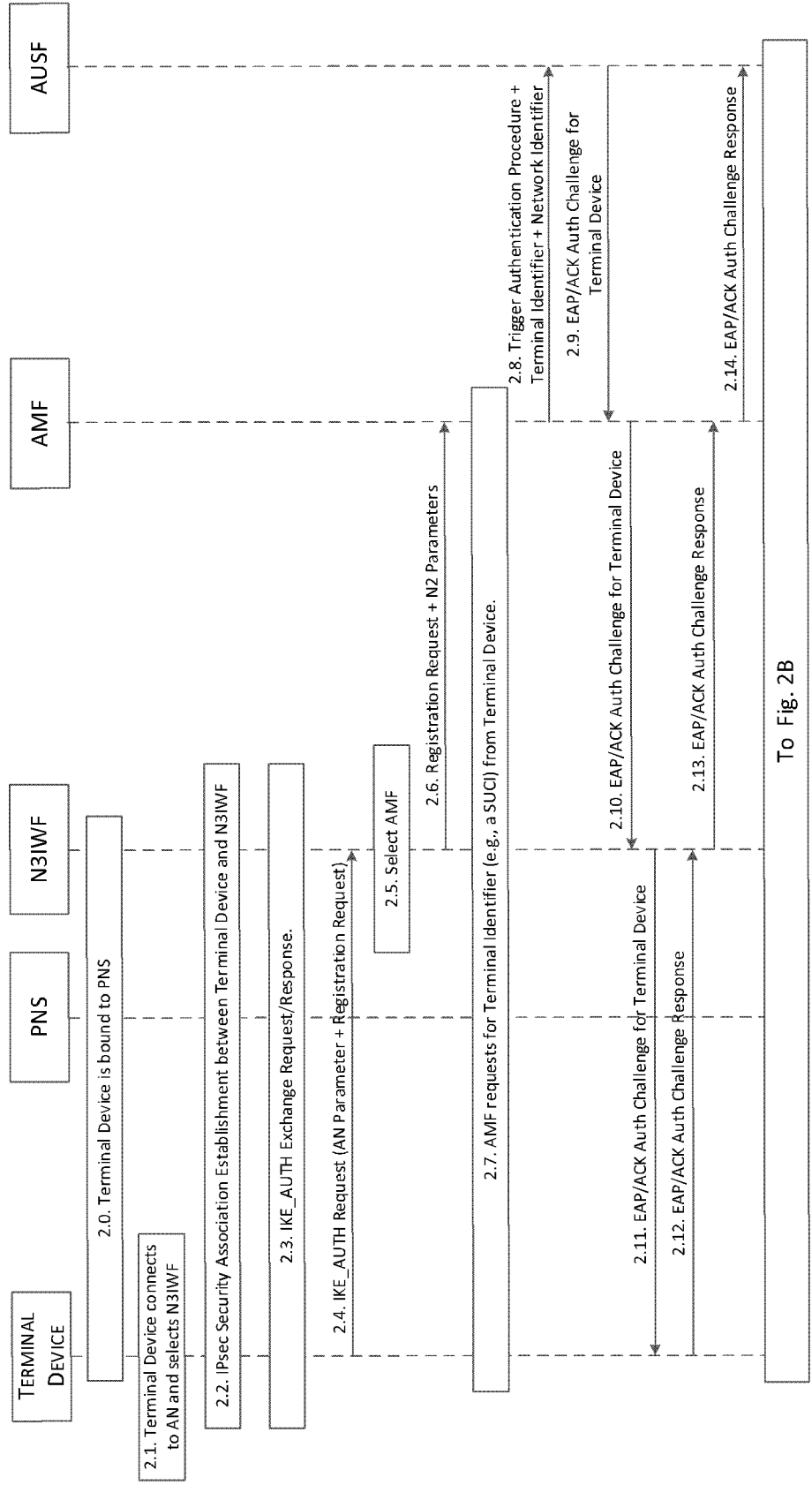
FIGS. 2A and 2B are sequence charts showing an exemplary process of registration of a terminal device to a 5GC network via an untrusted non-3GPP AN, with a push notification process for waking up the terminal device.
Figure 2B:
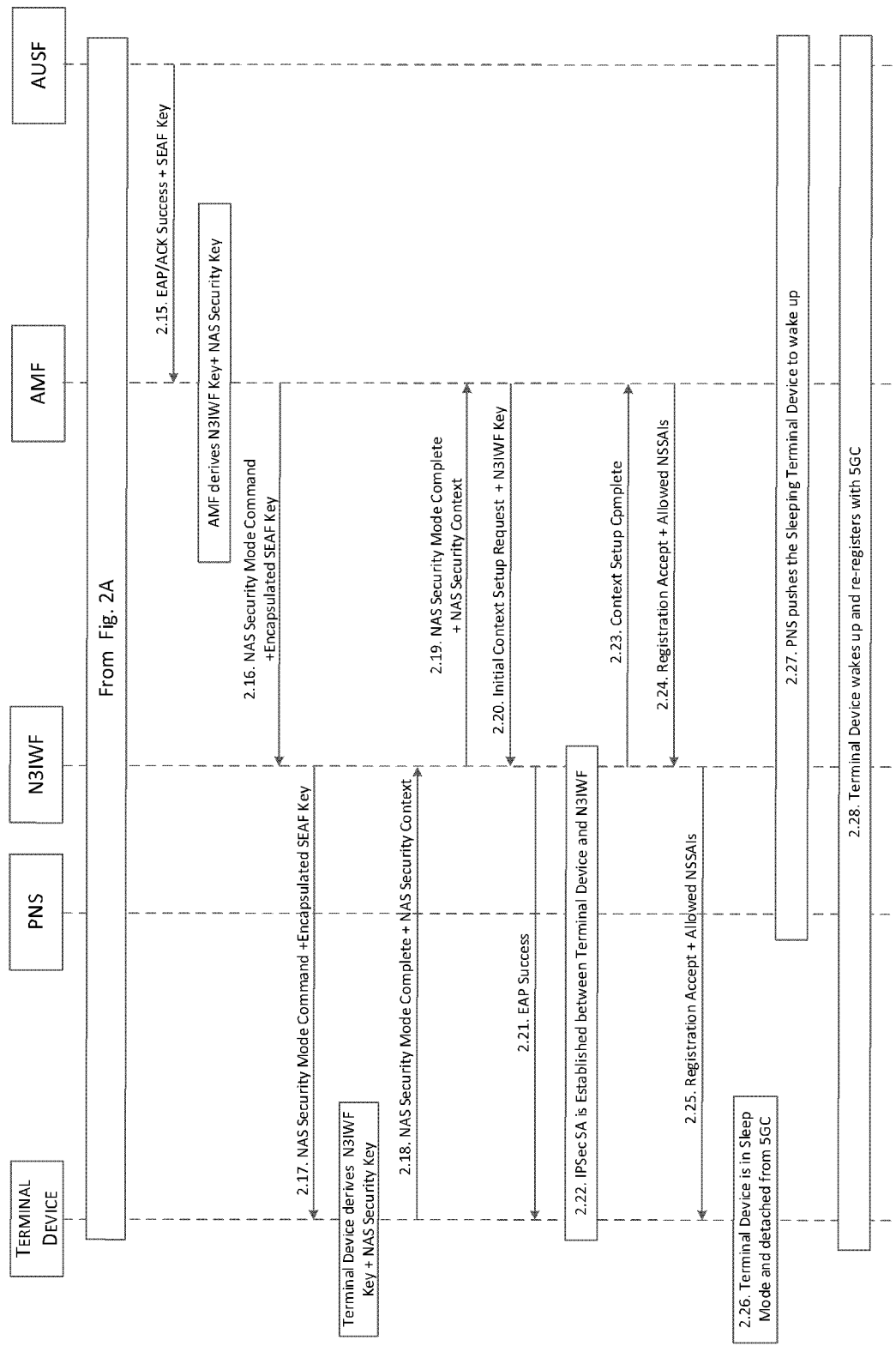
Figure 3:
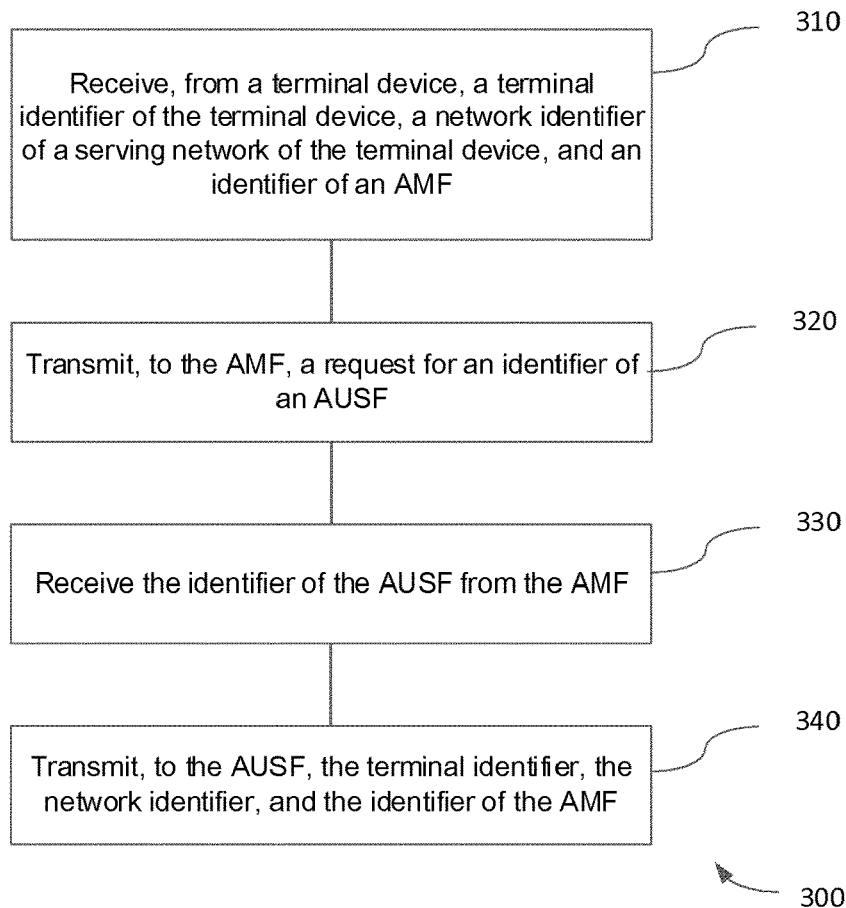
FIG. 3 is a flowchart illustrating a method in a PNS according to an embodiment of the present disclosure.

FIG. 3 is a flowchart illustrating a method 300 according to an embodiment of the present disclosure. The method can be performed by e.g., a PNS.

At block 310, a terminal identifier of a terminal device, a network identifier of a serving network of the terminal device, and an identifier of an AMF are received from the terminal device. In an example, the terminal identifier may be a SUCI.

At block 320, a request for an identifier of an AUSF is transmitted to the AMF. In an example, the request may contain the terminal identifier, the network identifier, and the identifier of the AMF.

At block 330, the identifier of the AUSF is received from the AMF.

At block 340, the terminal identifier, the network identifier, and the identifier of the AMF are transmitted to the AUSF.

In an example, e.g., subsequent to the block 340, a security key may be received from the AUSF, and then forwarded to the terminal device. In an example, the security key may be a SEAF key.

Figure 4:
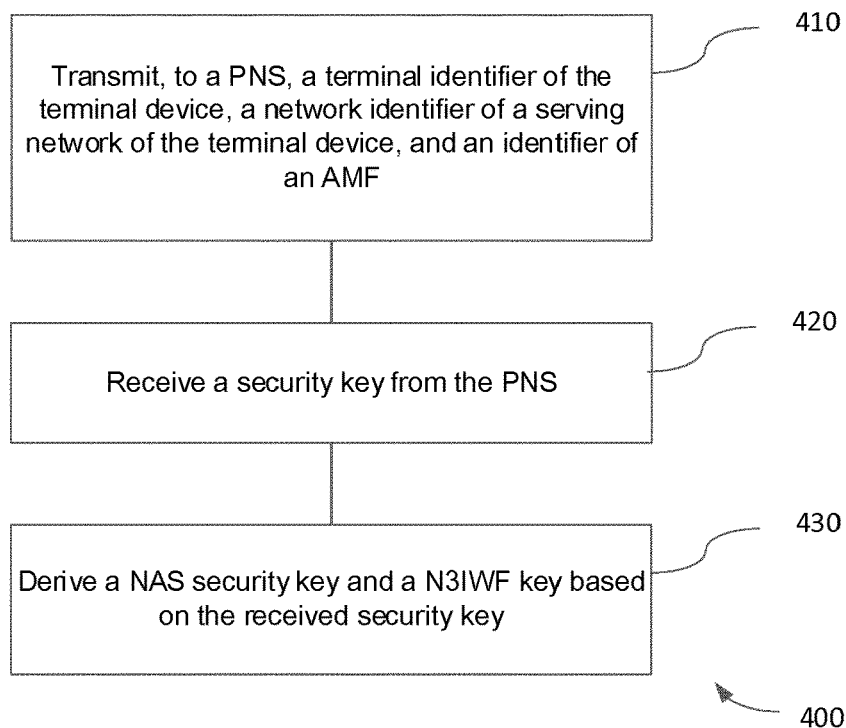
FIG. 4 is a flowchart illustrating a method in a terminal device according to an embodiment of the present disclosure.

FIG. 4 is a flowchart illustrating a method 400 according to an embodiment of the present disclosure. The method can be performed by e.g., a terminal device.

At block 410, a terminal identifier of the terminal device, a network identifier of a serving network of the terminal device, and an identifier of an AMF are transmitted to a PNS. In an example, the terminal identifier may be a SUCI.

At block 420, a security key is received from the PNS. In an example, the security key may be a SEAF key.

At block 430, a NAS security key and a N3IWF key are derived based on the received security key. Thus, the terminal device does not have to wait to receive the security key from an N3IWF (e.g., in a NAS Security Mode Command message) before it can derive the NAS security key and the N3IWF key. As a result, once the message is received, the terminal device can trigger Security Mode Complete immediately as it already has the NAS security key and the N3IWF key at this time, thereby reducing latency in the registration process.

In an example, the transmitting operation in the block 410 may be performed in parallel with transmitting the terminal identifier and the network identifier to the AMF. Thus, the registration of the terminal device can be further accelerated.

In an example, the deriving operation in the block 430 may be performed prior to receiving the security key from the N3IWF.

Figure 5:
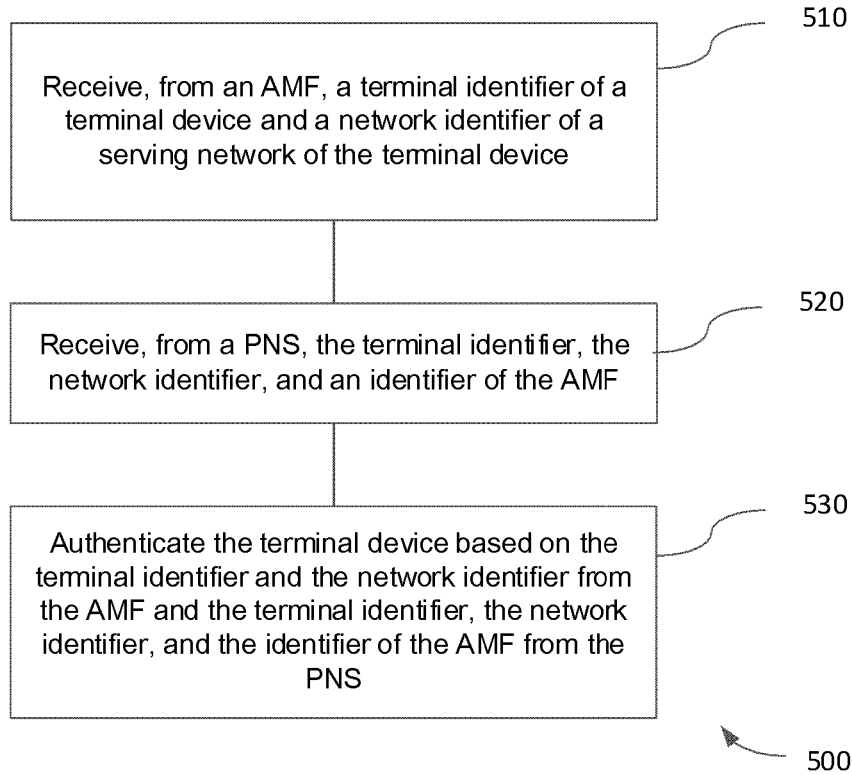
FIG. 5 is a flowchart illustrating a method in an AUSF according to an embodiment of the present disclosure.

FIG. 5 is a flowchart illustrating a method 500 according to an embodiment of the present disclosure. The method can be performed by e.g., an AUSF.

At block 510, a terminal identifier of a terminal device and a network identifier of a serving network of the terminal device are received from an AMF. In an example, the terminal identifier may be a SUCI.

At block 520, the terminal identifier, the network identifier, and an identifier of the AMF are received from a PNS.

At block 530, the terminal device is authenticated based on the terminal identifier and the network identifier from the AMF and the terminal identifier, the network identifier, and the identifier of the AMF from the PNS. In an example, the AUSF may authenticate the terminal device based on authentication data from a Unified Data Management (UDM) when the terminal identifier and the network identifier from the AMF are consistent with those from the PNS and the identifier of the AMF from the PNS is consistent with that of the AMF from which the terminal identifier and the network identifier are received.

In an example, in response to the authentication operation in the block 530, a security key may be transmitted to the PNS. In an example, the security key may be a SEAF key.

In an example, the receiving operation in the block 520 may be performed in parallel with the receiving operation in the block 510. Thus, the registration of the terminal device can be further accelerated.

In an example, in response to the terminal device being authenticated in the block 530, the security key may be transmitted to the AMF. In an example, the operation of transmitting the security key to the PNS may be performed in parallel with the operation of transmitting the security key to the AMF. Thus, the registration of the terminal device can be further accelerated.

Figure 6:
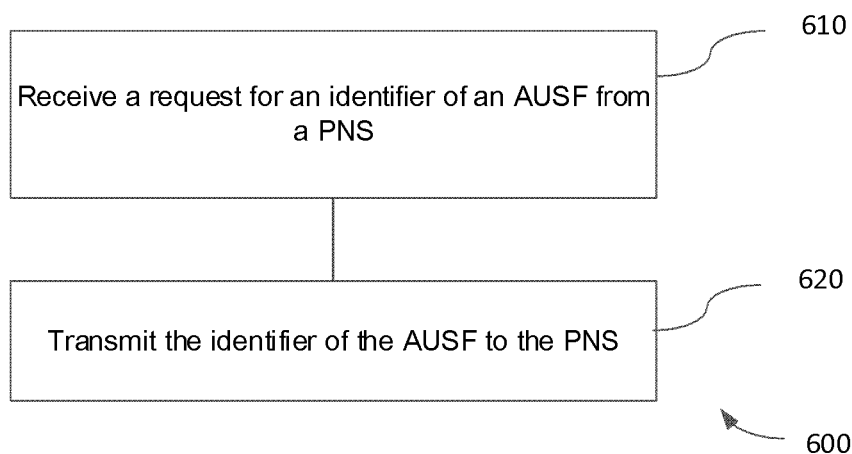
FIG. 6 is a flowchart illustrating a method in an AMF according to an embodiment of the present disclosure.

FIG. 6 is a flowchart illustrating a method 600 according to an embodiment of the present disclosure. The method can be performed by e.g., an AMF.

At block 610, a request for an identifier of an AUSF is received from a PNS.

In an example, the request may contain a terminal identifier of a terminal device, a network identifier of a serving network of the terminal device, and an identifier of the AMF. In an example, the terminal identifier may be a SUCI.

At block 620, the identifier of the AUSF is transmitted to the PNS.

In an example, e.g., prior to receiving the request in the block 610, the AMF may receive the terminal identifier and the network identifier from the terminal device.

For example, the operation of receiving from the PNS may be performed in parallel with the operation of receiving from the terminal device. Thus, the registration of the terminal device can be further accelerated.

In an example, e.g., subsequent to receiving the terminal identifier and the network identifier from the terminal device, the AMF may transmit the terminal identifier and the network identifier as received from the terminal device to the AUSF. For example, the operation of transmitting to the PNS may be performed in parallel with the operation of transmitting to the AUSF. Thus, the registration of the terminal device can be further accelerated.

The methods 300, 400, 500, and 600 will be explained in further detail below with reference to FIGS. 7A-7B.

Figure 7B:
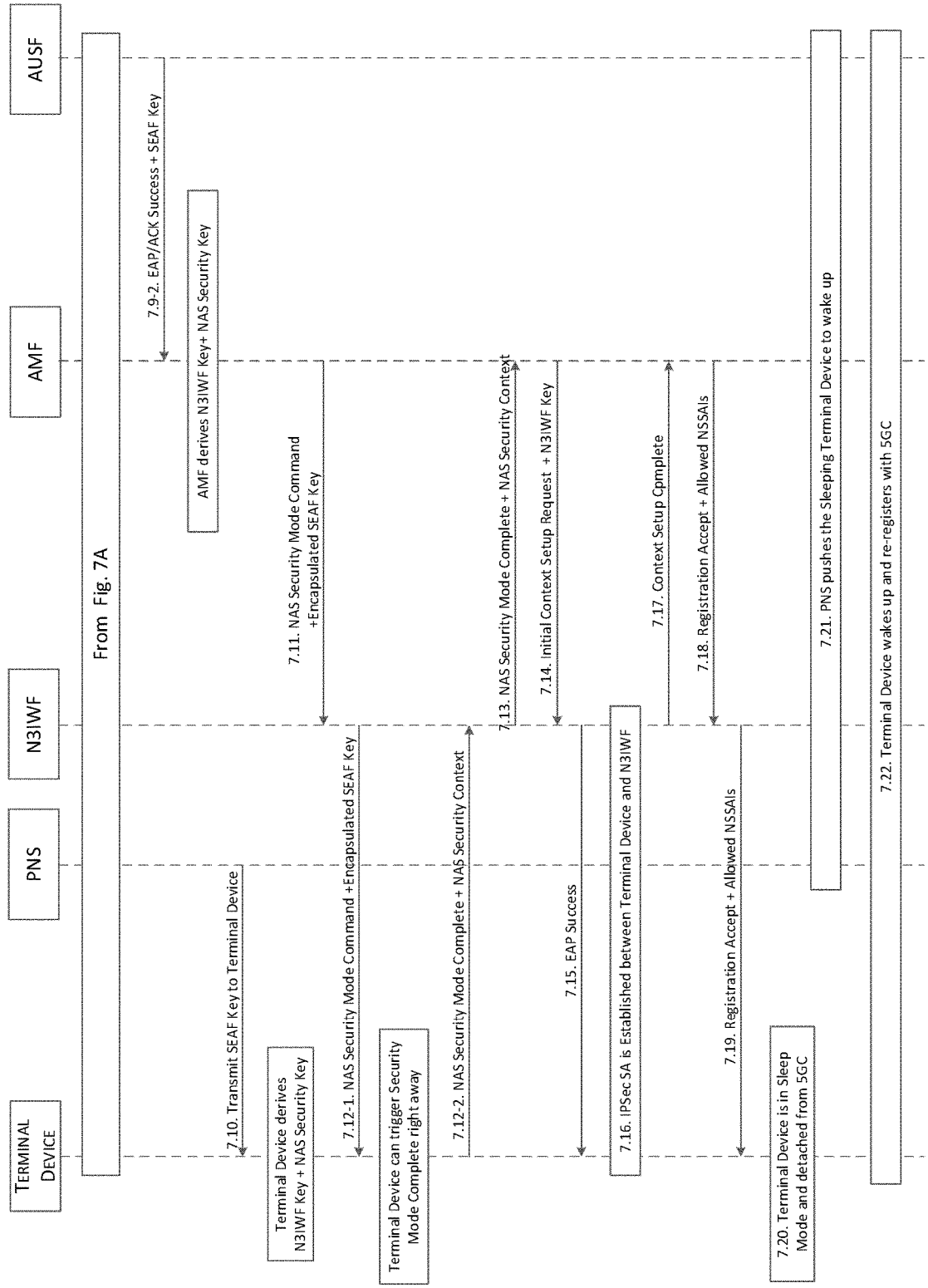

FIGS. 7A and 7B are sequence charts showing an exemplary registration process of a terminal device according to an embodiment of the present disclosure.

In this example, the terminal device registers with a 5GC network via an untrusted non-3GPP AN, e.g., a WiFi network. Here, the terminal device supports a push notification service, and is bound to a PNS, as shown at 7.0 in FIG. 7A.

At 7.1, the terminal device connects to the untrusted non-3GPP AN, and selects a N3IWF in a 5G PLMN in order to attach to the 5GC network. At 7.2, the terminal device performs establishment of an IPSec SA with the selected N3IWF by initiating an IKE to ensure all subsequent IKE messages are encrypted and integrity protected by using the established IPSec SA. At 7.3, the terminal device initiates an IKE_AUTH exchange by transmitting an IKE_AUTH request message. N3IWF responds with an IKE_AUTH response message which includes an EAP-Request/5G-Start packet. The EAP-Request/5G-Start packet informs the terminal device to initiate an EAP-5G session, i.e., to start transmitting NAS messages encapsulated within EAP-5G packets. At 7.4, the terminal device transmits, to the N3IWF, an IKE_AUTH request which includes an EAP-Response/5G-NAS packet that contains AN parameters and a Registration Request. The AN parameters may contain information that is used by the N3IWF for selecting an AMF in the 5GC network, e.g., a GUAMI, an ID of the selected PLMN, a NSSAI, and an establishment cause. At 7.5, the N3IWF selects an AMF based on the received AN parameters and local policy. At 7.6, the N3IWF forwards the Registration Request received from the terminal device to the selected AMF within an N2 message, which contains N2 parameters, e.g., the ID of the selected PLMN and the establishment cause.

Continuing with FIG. 7A, at 7.7-1, the selected AMF requests a terminal identifier of the terminal device, e.g., a SUCI, by transmitting a NAS Identity Request message to the terminal device. This NAS Identity Request message and all subsequent NAS messages are transmitted to the terminal device encapsulated within EAP/5G-NAS packets. The terminal device responds to the AMF with the requested terminal identifier and a network identifier of a serving network of the terminal device. At 7.7-2, in parallel to transmitting the terminal identifier and the network identifier to the AMF, the terminal device shall also inform the identifier of the AMF (also referred to as an AMF ID), the terminal identifier and the network identifier to the PNS using a push notification interface between the terminal device and the PNS. At 7.7-3, the PNS contacts the AMF indicated by the AMF ID, and forwards the terminal identifier and the network identifier (i.e., visiting network's PLMN ID) to the AMF. At 7.8-1, upon receiving the terminal identifier and the network identifier at 7.7-1, the AMF may decide to authenticate the terminal device by invoking an AUSF. In this case, the AMF selects an AUSF based on the terminal identifier and forwards the terminal identifier and the network identifier to the AUSF. At 7.8-2, in parallel to forwarding the terminal identifier and the network identifier to the AUSF, the AMF informs the PNS the identifier of the selected AUSF (also referred to as an AUSF ID). At 7.8-3, upon receiving the AUSF ID, the PNS forwards, to the AUSF, the AMF ID, the terminal identifier and the network identifier. Then, the terminal device may be authenticated based on the terminal identifier and the network identifier from the AMF and the terminal identifier, the network identifier, and the AMF ID from the PNS. As an example, the AUSF may authenticate the terminal device based on authentication data from an UDM, when the terminal identifier and the network identifier from the AMF are consistent with those from the PNS and the identifier of the AMF from the PNS is consistent with that of the AMF from which the terminal identifier and the network identifier are received. In this way, sequentially performed authentication steps 2.9-2.14 can be omitted, thereby accelerating the registration process and saving communication resources. At 7.9-1, in the case where the terminal device is authenticated, the AUSF transmits a security key, e.g., a SEAF key, to the PNS.

Turning to FIG. 7B, at 7.9-2, in parallel to step 7.9-1, the AUSF also transmits the SEAF key to the AMF. The AMF may derive NAS security keys and a N3IWF key based on the received SEAF key. At 7.10, upon receiving the SEAF key, the PNS forwards it to the terminal device, thus the terminal device can also derive the NAS security keys and the N3IWF key based on the received SEAF key. At 7.11, the AMF transmits a NAS Security Mode Command and an encapsulated SEAF key to the N3IWF. At 7.12-1, the N3IWF forwards the NAS Security Mode Command and the encapsulated SEAF key to the terminal device. Since the terminal device has already received the SEAF key at 7.10 and derived the NAS security keys and the N3IWF key based thereon, the terminal device can trigger a Security Mode Complete message immediately. At 7.12-2, the terminal device transmits a NAS Security Mode Complete message along with a NAS security context to the N3IWF. At 7.13, the N3IWF forwards the NAS Security Mode Complete message along with the NAS security context to the AMF. At 7.14, upon receiving the NAS Security Mode Complete, the AMF transmits, to the N3IWF, a NGAP Initial Context Setup Request message that includes the N3IWF key. At 7.15, the N3IWF transmits an EAP Success message to the terminal device, which completes the EAP-5G session.

Continuing with FIG. 7B, at 7.16, the IPSec SA is established between the terminal device and the N3IWF. At 7.17, the N3IWF notifies the AMF that a context for the terminal device has been created by transmitting a Context Setup Complete message. At 7.18, the AMF transmits, to the N3IWF, a NAS Registration Accept message containing a list of allowed NSSAIs for the access type for the terminal device. At 7.19, the N3IWF forwards the NAS Registration Accept message to the terminal device via the established IPSec SA, which completes the registration process. After the registration process from step 7.1 in FIG. 7A to step 7.19 in FIG. 7B is completed, at 7.20, the terminal device may enter a sleeping mode for saving resources and thus be detached from the 5GC network. At 7.21, when there is a terminating request targeted to the terminal device, the PNS wakes up the terminal device through a push notification process. At 7.22, the terminal device wakes up and re-registers with the 5GC network, e.g., by performing the above registration process again.

Figure 8:
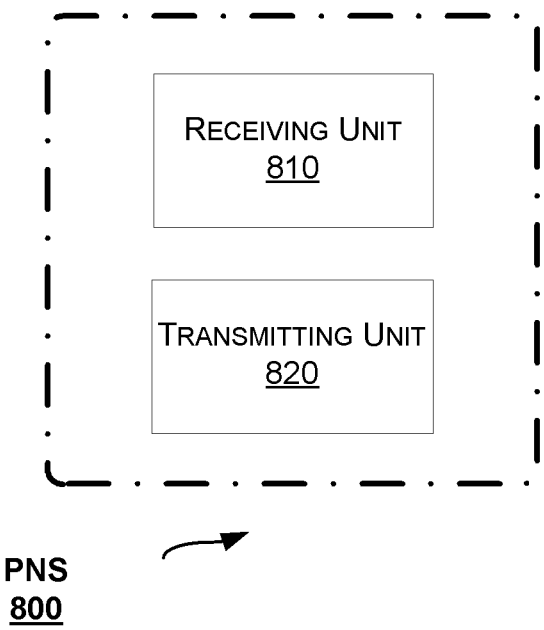
FIG. 8 is a block diagram of a PNS according to an embodiment of the present disclosure.

Correspondingly to the method 300 as described above, a PNS is provided. FIG. 8 is a block diagram of a PNS 800 according to an embodiment of the present disclosure.

The PNS 800 can be the PNS shown in FIG. 2A-2B, or 7A-7B, and can be configured to perform the method 300 as described above in connection with FIG. 3. As shown in FIG. 8, the PNS 800 includes a receiving unit 810 configured to receive, from a terminal device, a terminal identifier of the terminal device, a network identifier of a serving network of the terminal device, and an identifier of an AMF. The PNS 800 further includes a transmitting unit 820 configured to transmit, to the AMF, a request for an identifier of an AUSF. The receiving unit 810 is further configured to receive the identifier of the AUSF from the AMF, and the transmitting unit 820 is further configured to transmit, to the AUSF, the terminal identifier, the network identifier, and the identifier of the AMF.

In an example, the request may contain the terminal identifier, the network identifier, and the identifier of the AMF.

In an example, the receiving unit 810 may be further configured to receive a security key from the AUSF, and the transmitting unit 820 may be further configured to transmit the security key to the terminal device.

In an example, the security key may be a SEAF key.

In an example, the terminal identifier may be a SUCI.

The units 810~820 can be implemented as a pure hardware solution or as a combination of software and hardware, e.g., by one or more of: a processor or a micro-processor and adequate software and memory for storing the software, a Programmable Logic Device (PLD) or other electronic component(s) or processing circuitry configured to perform the actions described above, and illustrated, e.g., in FIG. 3.

Figure 9:
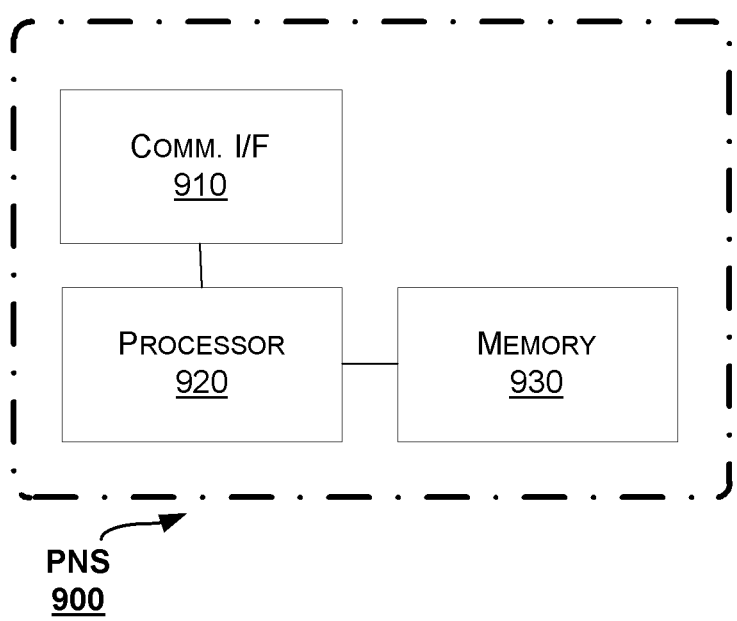
FIG. 9 is a block diagram of a PNS according to another embodiment of the present disclosure.

FIG. 9 is a block diagram of a PNS 900 according to another embodiment of the present disclosure.

The PNS 900 includes a communication interface 910, a processor 920 and a memory 930. The memory 930 contains instructions executable by the processor 920 whereby the PNS 900 is operative to perform the actions, e.g., of the process described earlier in conjunction with FIG. 3.

As an example, the PNS 900 can be the PNS shown in FIG. 2A-2B or 7A-7B. Particularly, the memory 930 can contain instructions executable by the processor 920 whereby the PNS 900 is operative to: receive, from a terminal device, a terminal identifier of the terminal device, a network identifier of a serving network of the terminal device, and an identifier of an AMF; transmitting, to the AMF, a request for an identifier of an AUSF; receive the identifier of the AUSF from the AMF; and transmit, to the AUSF, the terminal identifier, the network identifier, and the identifier of the AMF.

In an embodiment, the request may contain the terminal identifier, the network identifier, and the identifier of the AMF.

In an embodiment, the memory 930 can further contain instructions executable by the processor 920 whereby the PNS 900 is operative to: receive a security key from the AUSF; and transmit the security key to the terminal device.

In an example, the security key may be a SEAF key.

In an example, the terminal identifier may be a SUCI.

Figure 10:
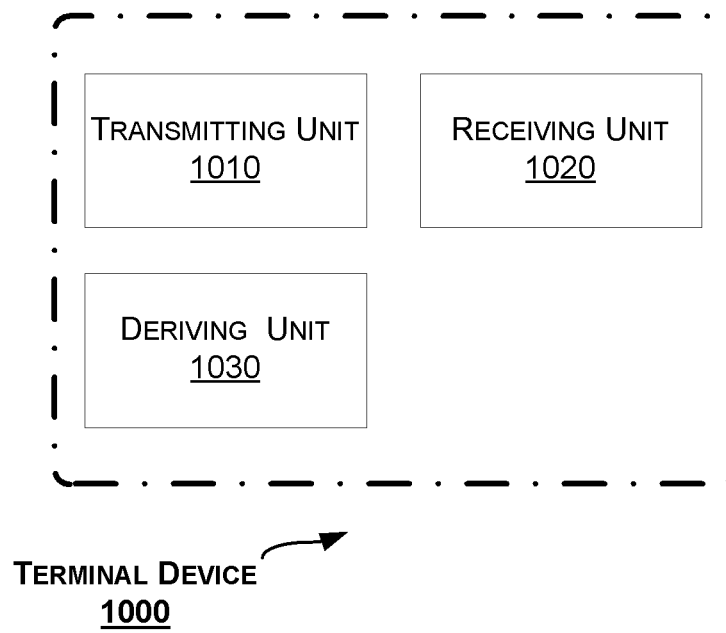
FIG. 10 is a block diagram of a terminal device according to an embodiment of the present disclosure.

Correspondingly to the method 400 as described above, a terminal device is provided. FIG. 10 is a block diagram of a terminal device 1000 according to an embodiment of the present disclosure.

The terminal device 1000 can be the terminal device shown in FIG. 1A-1B, 2A-2B, or 7A-7B, and can be configured to perform the method 400 as described above in connection with FIG. 4. As shown in FIG. 10, the terminal device 1000 includes a transmitting unit 1010 configured to transmit, to a PNS, a terminal identifier of the terminal device, a network identifier of a serving network of the terminal device, and an identifier of an AMF. The terminal device 1000 further includes a receiving unit 1020 configured to receive a security key from the PNS. The terminal device 1000 further includes a deriving unit 1030 configured to derive a NAS security key and a N3IWF key based on the received security key.

In an example, the operation of transmitting may be performed in parallel with transmitting the terminal identifier and the network identifier to the AMF.

In an example, the security key may be a SEAF key.

In an example, the terminal identifier may be a SUCI.

In an example, the operation of deriving may be performed prior to receiving the security key from an N3IWF.

The units 1010~1030 can be implemented as a pure hardware solution or as a combination of software and hardware, e.g., by one or more of: a processor or a microprocessor and adequate software and memory for storing the software, a Programmable Logic Device (PLD) or other electronic component(s) or processing circuitry configured to perform the actions described above, and illustrated, e.g., in FIG. 4.

Figure 11:
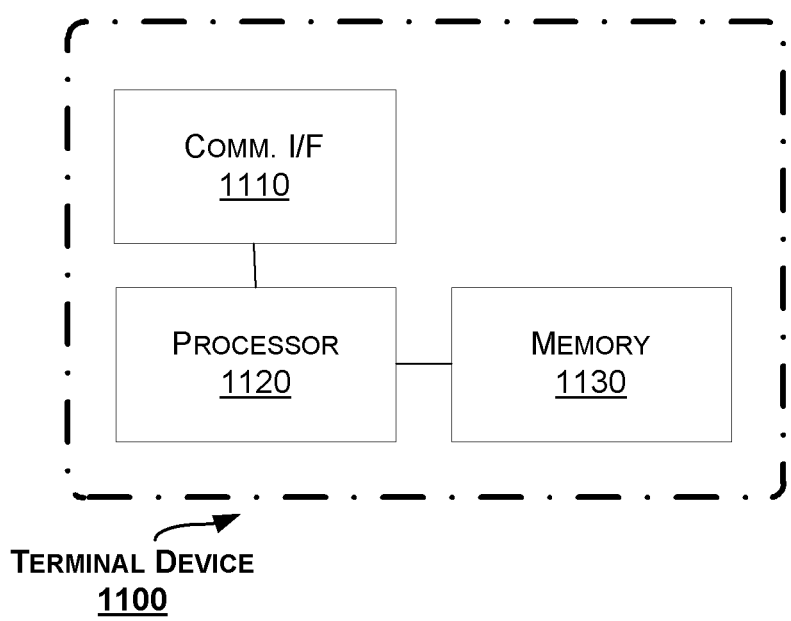
FIG. 11 is a block diagram of a terminal device according to another embodiment of the present disclosure.

FIG. 11 is a block diagram of a terminal device 1100 according to another embodiment of the present disclosure.

The terminal device 1100 includes a communication interface 1110, a processor 1120 and a memory 1130. The memory 1130 contains instructions executable by the processor 1120 whereby the terminal device 1100 is operative to perform the actions, e.g., of the process described earlier in conjunction with FIG. 4.

The terminal device 1100 can be the terminal device shown in FIG. 1A-1B, 2A-2B, or 7A-7B. Particularly, the memory 1130 can contain instructions executable by the processor 1120 whereby the terminal device 1100 is operative to: transmit, to a PNS, a terminal identifier of the terminal device, a network identifier of a serving network of the terminal device, and an identifier of an AMF; receive a security key from the PNS; and derive a NAS security key and a N3IWF key based on the received security key.

In an example, the operation of transmitting may be performed in parallel with transmitting the terminal identifier and the network identifier to the AMF.

In an example, the security key may be a SEAF key.

In an example, the terminal identifier may be a SUCI.

In an example, the operation of deriving may be performed prior to receiving the security key from an N3IWF.

Figure 12:
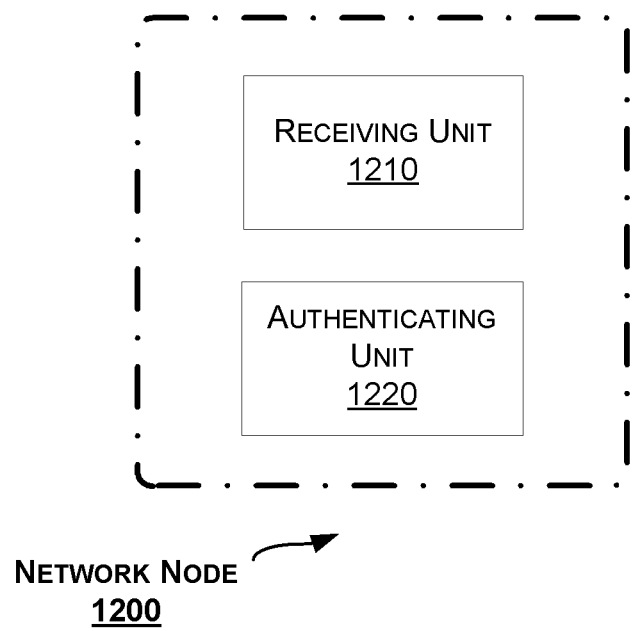
FIG. 12 is a block diagram of a network node according to an embodiment of the present disclosure.

Correspondingly to the method 500 as described above, a network node is provided. FIG. 12 is a block diagram of a network node 1200 according to an embodiment of the present disclosure.

The network node 1200 can be, e.g., the AUSF shown in FIG. 1A-1B, 2A-2B, or 7A-7B, and can be configured to perform the method 500 as described above in connection with FIG. 5. As shown in FIG. 12, the network node 1200 includes a receiving unit 1210 configured to receive, from an AMF, a terminal identifier of a terminal device and a network identifier of a serving network of the terminal device. The receiving unit 1210 is further configured to receive, from a PNS, the terminal identifier, the network identifier, and an identifier of the AMF. The network node 1200 further includes an authenticating unit 1220 configured to authenticate the terminal device based on the terminal identifier and the network identifier from the AMF and the terminal identifier, the network identifier, and the identifier of the AMF from the PNS.

In an example, the network node 1200 may further include a transmitting unit configured to transmit, in response to the operation of authenticating, a security key to the PNS.

In an example, the operation of receiving from the PNS may be performed in parallel with the operation of receiving from the AMF.

In an example, the transmitting unit may be further configured to transmit, in response to the operation of authenticating, the security key to the AMF, and the operation of transmitting the security key to the PNS may be performed in parallel with the operation of transmitting the security key to the AMF.

In an example, the terminal identifier may be a SUCI.

In an example, the security key may be a SEAF key.

The units 1210~1220 can be implemented as a pure hardware solution or as a combination of software and hardware, e.g., by one or more of: a processor or a microprocessor and adequate software and memory for storing the software, a Programmable Logic Device (PLD) or other electronic component(s) or processing circuitry configured to perform the actions described above, and illustrated, e.g., in FIG. 5.

Figure 13:
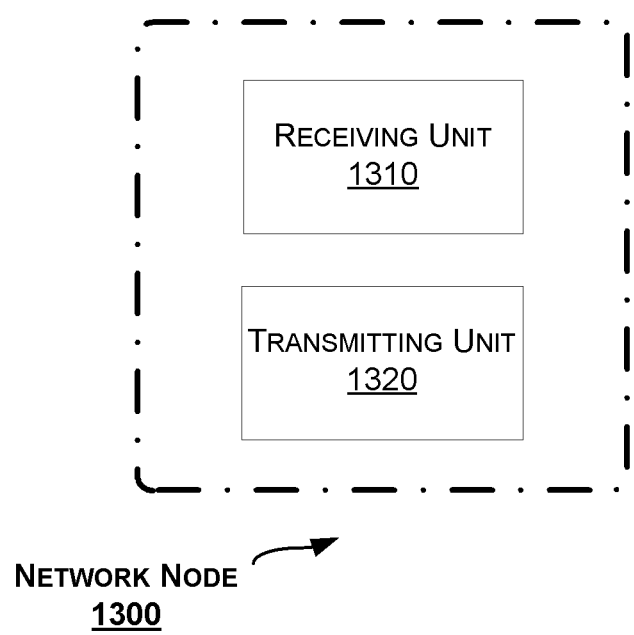
FIG. 13 is a block diagram of a network node according to another embodiment of the present disclosure.

Correspondingly to the method 600 as described above, a network node is provided. FIG. 13 is a block diagram of a network node 1300 according to an embodiment of the present disclosure.

The network node 1300 can be, e.g., the AMF shown in FIG. 1A-1B, 2A-2B, or 7A-7B, and can be configured to perform the method 600 as described above in connection with FIG. 6. As shown in FIG. 13, the network node 1300 includes a receiving unit 1310 configured to receive a request for an identifier of an AUSF from a PNS. The network node 1300 further includes a transmitting unit 1320 configured to transmit the identifier of the AUSF to the PNS.

In an example, the request may contain a terminal identifier of a terminal device, a network identifier of a serving network of the terminal device, and an identifier of the AMF.

In an example, the receiving unit 1310 may be further configured to receive, from the terminal device, the terminal identifier and the network identifier, and the operation of receiving from the PNS may be performed in parallel with the operation of receiving from the terminal device.

In an example, the transmitting unit 1320 may be further configured to transmit, to the AUSF, the terminal identifier and the network identifier as received from the terminal device, and the operation of transmitting to the PNS may be performed in parallel with the operation of transmitting to the AUSF.

In an example, the terminal identifier may be a SUCI.

The units 1310~1320 can be implemented as a pure hardware solution or as a combination of software and hardware, e.g., by one or more of: a processor or a microprocessor and adequate software and memory for storing the software, a Programmable Logic Device (PLD) or other electronic component(s) or processing circuitry configured to perform the actions described above, and illustrated, e.g., in FIG. 6.

Figure 14:
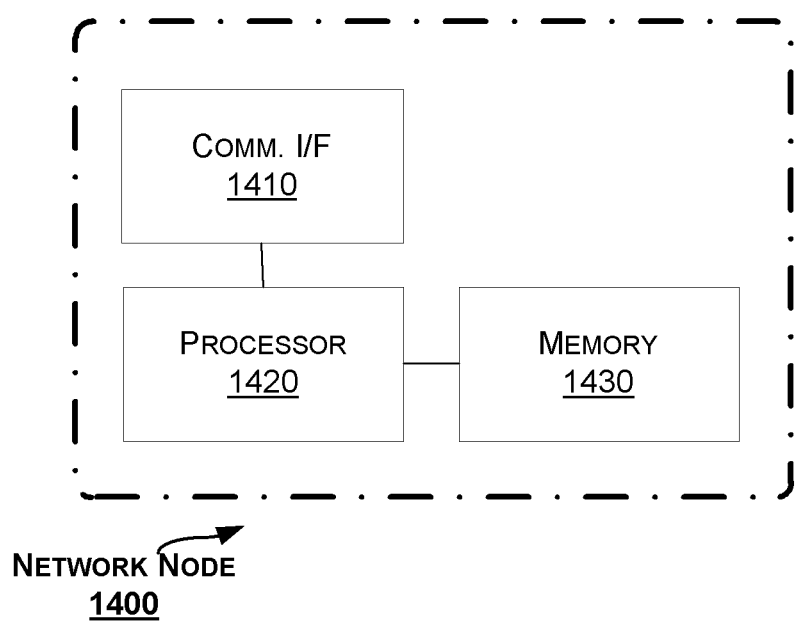
FIG. 14 is a block diagram of a network node according to yet another embodiment of the present disclosure.

FIG. 14 is a block diagram of a network node 1400 according to another embodiment of the present disclosure.

The network node 1400 includes a communication interface 1410, a processor 1420 and a memory 1430.

As an example, the network node 1400 can be the AUSF shown in FIG. 1A-1B, 2A-2B, or 7A-7B. The memory 1430 can contain instructions executable by the processor 1420 whereby the network node 1400 is operative to, when implementing an AUSF, perform the actions, e.g., of the process described earlier in conjunction with FIG. 5. Particularly, the memory 1430 can contain instructions executable by the processor 1420 whereby the network node 1400 is operative to, when implementing an AUSF: receive, from an AMF, a terminal identifier of a terminal device and a network identifier of a serving network of the terminal device; receive, from a PNS, the terminal identifier, the network identifier, and an identifier of the AMF; and authenticate the terminal device based on the terminal identifier and the network identifier from the AMF and the terminal identifier, the network identifier, and the identifier of the AMF from the PNS.

In an example, the memory 1430 can further contain instructions executable by the processor 1420 whereby the network node 1400 is operative to when implementing the AUSF: transmit, in response to the operation of authenticating, a security key to the PNS.

In an example, the operation of receiving from the PNS may be performed in parallel with the operation of receiving from the AMF.

In an example, the memory 1430 can further contain instructions executable by the processor 1420 whereby the network node 1400 is operative to, when implementing the AUSF: transmit, in response to the operation of authenticating, the security key to the AMF. In an example, the operation of transmitting the security key to the PNS may be performed in parallel with the operation of transmitting the security key to the AMF.

In an example, the terminal identifier may be a SUCI.

In an example, the security key may be a key.

Alternatively, the network node 1400 can be the AMF shown in FIG. 1A-1B, 2A-2B, or 7A-7B. The memory 1430 can contain instructions executable by the processor 1420 whereby the network node 1400 is operative to, when implementing an AMF, perform the actions, e.g., of the process described earlier in conjunction with FIG. 6. Particularly, the memory 1430 can contain instructions executable by the processor 1420 whereby the network node 1400 is operative to, when implementing an AMF: receive a request for an identifier of an AUSF from a PNS; and transmit the identifier of the AUSF to the PNS.

In an example, the request may contain a terminal identifier of a terminal device, a network identifier of a serving network of the terminal device, and an identifier of the AMF.

In an example, the memory 1430 can further contain instructions executable by the processor 1420 whereby the network node 1400 is operative to, when implementing the AMF: receive, from the terminal device, the terminal identifier and the network identifier. In an example, the operation of receiving from the PNS may be performed in parallel with the operation of receiving from the terminal device.

In an example, the memory 1430 can further contain instructions executable by the processor 1420 whereby the network node 1400 is operative to, when implementing the AMF: transmit, to the AUSF, the terminal identifier and the network identifier as received from the terminal device. In an example, the operation of transmitting to the PNS may be performed in parallel with the operation of transmitting to the AUSF.

In an example, the terminal identifier may be a SUCI.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 920, causes the PNS 900 to perform the actions, e.g., of the process described earlier in conjunction with FIG. 3, code/computer readable instructions, which when executed by the processor 1120, causes the terminal device 1100 to perform the actions, e.g., of the process described earlier in conjunction with FIG. 4, code/computer readable instructions, which when executed by the processor 1420, causes the network node 1400 to, when implementing an AUSF, perform the actions, e.g., of the process described earlier in conjunction with FIG. 5, or code/computer readable instructions, which when executed by the processor 1420, causes the network node 1400 to, when implementing an AMF, perform the actions, e.g., of the process described earlier in conjunction with FIG. 6.

The computer program product may be configured as a computer program code structured in computer program modules. The computer program modules could essentially perform the actions of the flow illustrated in FIG. 3, 4, 5 or 6.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-Access Memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Push Notification Server (PNS), comprising:
   receiving, from a terminal device, a terminal identifier of the terminal device, a network identifier of a serving network of the terminal device, and an identifier of an Access and Mobility Management Function (AMF);
   transmitting, to the AMF, a request for an identifier of an Authentication Server Function (AUSF);
   receiving the identifier of the AUSF from the AMF;
   transmitting, to the AUSF, the terminal identifier, the network identifier, and the identifier of the AMF;
   receiving a security key from the AUSF; and
   transmitting the security key to the terminal device.

2. The method of claim 1, wherein the request contains the terminal identifier, the network identifier, and the identifier of the AMF.

3. The method of claim 1, wherein the security key is a Security Anchor Function (SEAF) key.

4. The method of claim 1, wherein the terminal identifier is a Subscriber Concealed Identifier (SUCI).

5. A Push Notification Server (PNS) comprising a communication interface, a processor, and a memory, the memory comprising instructions executable by the processor whereby the PNS is operative to perform following steps:
   receiving, from a terminal device, a terminal identifier of the terminal device, a network identifier of a serving network of the terminal device, and an identifier of an Access and Mobility Management Function (AMF);
   transmitting, to the AMF, a request for an identifier of an Authentication Server Function (AUSF);
   receiving the identifier of the AUSF from the AMF;
   transmitting, to the AUSF, the terminal identifier, the network identifier, and the identifier of the AMF;
   receiving a security key from the AUSF; and
   transmitting the security key to the terminal device.

6. A method in an Authentication Server Function (AUSF), the method comprising:
   receiving, from an Access and Mobility Management Function, AMF, a terminal identifier of a terminal device and a network identifier of a serving network of the terminal device;
   receiving, from a Push Notification Server (PNS), the terminal identifier, the network identifier, and an identifier of the AMF; and
   authenticating the terminal device based on the terminal identifier and the network identifier from the AMF and the terminal identifier, the network identifier, and the identifier of the AMF from the PNS;
   transmitting, in response to said authenticating, a security key to the PNS; and
   transmitting, in response to said authenticating, the security key to the AMF,
   wherein said transmitting the security key to the PNS is performed in parallel with said transmitting the security key to the AMF.

7. The method of claim 6, wherein said receiving from the PNS is performed in parallel with said receiving from the AMF.

8. The method of claim 6, wherein the terminal identifier is a Subscriber Concealed Identifier (SUCI).

9. The method of claim 6, wherein the security key is a Security Anchor Function (SEAF) key.

* * * * *